US006731450B1

(12) United States Patent
Codilian et al.

(10) Patent No.: US 6,731,450 B1
(45) Date of Patent: May 4, 2004

(54) DISK DRIVE CONTROL SYSTEM AND METHOD FOR DETERMINING THE TEMPERATURE OF AN ACTUATOR COIL

(75) Inventors: Raffi Codilian, Irvine, CA (US); George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 504 days.

(21) Appl. No.: 09/728,550

(22) Filed: Nov. 30, 2000

(51) Int. Cl.[7] .................... G11B 15/18; G11B 17/00; G11B 19/02
(52) U.S. Cl. .......................... 360/69; 360/75
(58) Field of Search ................ 360/69, 75, 78.04, 360/78.06, 78.09; 318/569

(56) References Cited

U.S. PATENT DOCUMENTS

| | | | |
|---|---|---|---|
| 5,015,937 A | * | 5/1991 | Wright et al. ............... 318/696 |
| 5,119,250 A | * | 6/1992 | Green et al. ............. 360/78.04 |
| 5,128,813 A | * | 7/1992 | Lee ........................... 360/78.06 |
| 5,566,077 A | * | 10/1996 | Kulakowski et al. ....... 700/299 |
| 5,594,603 A | * | 1/1997 | Mori et al. ............... 360/78.04 |
| 5,654,840 A | * | 8/1997 | Patton et al. ................. 360/75 |
| 5,726,835 A | | 3/1998 | Scanlon et al. |
| 5,768,045 A | | 6/1998 | Patton et al. |
| 5,781,363 A | * | 7/1998 | Rowan et al. ........... 360/78.09 |
| 5,793,558 A | | 8/1998 | Codilian et al. |
| 5,808,438 A | * | 9/1998 | Jeffrey ....................... 318/634 |
| 5,889,629 A | | 3/1999 | Patton et al. |
| 6,163,430 A | * | 12/2000 | Hansen ..................... 360/78.06 |
| 6,342,985 B1 | * | 1/2002 | Clare et al. .................... 360/75 |
| 6,369,972 B1 | * | 4/2002 | Codilian et al. ......... 360/78.04 |
| 6,594,106 B1 | * | 7/2003 | Serrano et al. .......... 360/78.09 |

OTHER PUBLICATIONS

Raffi Codilian & Samuel K. Woo; Voice Coil Motor Thermal Resistance In Hard Disk Drives; Western Digital Corp.; Irvine, California.

* cited by examiner

*Primary Examiner*—David Hudspeth
*Assistant Examiner*—Jason Olson
(74) *Attorney, Agent, or Firm*—Milad G. Shara, Esq.; Knobbe Marten Olson & Bear; Ramin Mobarhan, Esq.

(57) ABSTRACT

A hard disk drive comprising an actuator control system that measures the temperature of an actuator coil and methods for providing the same. The control system comprises a controller and a current source controlled by the controller that generates a flow of current through the actuator so as to reposition a transducer of the drive. The control system further comprises sampling means for sampling at least one electrical characteristic of a conducting path defined by the coil. The control system measures the temperature by monitoring the current flowing through the coil and/or the voltage across the coil and by extracting the coil temperature from the monitored values. In one embodiment, the control system obtains a measurement of the coil by successively approximating the resistance of the coil until an estimated back emf component of the voltage across the coil.

8 Claims, 12 Drawing Sheets

DISK DRIVE CONTROL SYSTEM AND METHOD FOR DETERMINING THE TEMPERATURE OF AN ACTUATOR COIL

BACKGROUND OF THE INVENTION

1. Field of the Invention

The present invention relates to computer data storage devices and, in particular, relates to a method of monitoring the temperature of an actuator coil of a hard disk drive by sampling the electrical properties of the coil.

2. Description of the Related Art

Hard disk drive storage devices are an important component in virtually all computer systems. In particular, hard disk drives provide computer systems with the ability to store and retrieve data in a non-volatile manner such that the data is maintained even if power is removed from the device. The popularity of these devices is based on their ability to quickly store and retrieve large quantities of digital information at low cost. However, because the computer industry continually strives to provide computer systems with increased performance, there exists a need for improved disk drives having increased data access speeds.

The typical hard disk drive comprises one or more pivotally mounted disks having a magnetic recording layer disposed thereon and a plurality of magnetic transducer elements for affecting and sensing the magnetization states of the recording layer. The recording layer comprises a large number of relatively small domains disposed thereon that can be independently magnetized according to a localized applied magnetic field and that can be maintained in the magnetized state when the external field is removed. The domains are grouped into concentric circular tracks each having a unique radius on the disk and data is written to or read from each track by positioning the transducer adjacent the disk at the corresponding radius while the disk is rotated at a fixed angular speed.

To position the transducer with respect to the disk, the typical hard disk drive further comprises a pivotally mounted actuator arm for supporting the transducer, a voice coil motor (VCM) for exerting a torque onto the actuator arm, and a servo-controller for controlling the VCM. The VCM comprises a coil of conducting wire wound into a plurality of loops and a permanent magnet disposed adjacent the coil. The servo-controller initiates movement of the actuator arm by directing a control current to flow through the coil which results in the permanent magnet applying a force onto the coil which is then transferred to the actuator arm in the form of a torque. Because the direction of the torque is dictated by the direction of control current flow, the servo-controller is able to reposition the transducer by first directing the control current through the coil so as to angularly accelerate the actuator arm in a first direction and then reversing the control current so as to angularly decelerate the actuator arm.

The time required to reposition the transducer in the foregoing manner is known as the "seek time" of the drive and is a critical performance factor that limits the throughput of the drive. For example, a drive having a short average seek time will generally be able to access a requested track of data more quickly than a drive having a longer average seek time. According to the state of the art, for a transducer having a linear acceleration greater than 500 meters/s$^2$ or 50 g's, the seek time required to reposition the transducer across a distance of 2.5 cm is typically in the range of 20–30 ms. Consequently, to provide such large acceleration, a relatively large (0.5 to 1A) current is often required to flow through the coil.

Unfortunately, when large amounts of current are directed through the coil, the rate of heat gain caused by the finite resistance of the windings of the coil may exceed the rate of heat loss to the environment. Thus, if left unchecked for an extended period of time, a rapid succession of seek operations may excessively raise the temperature of the coil such that the drive will no longer be operable. For example, when subjected to an instantaneous or average current that is beyond the VCM's design limitations, the coil may generate excessive heat and rupture, or the coil overmold material may delaminate from the actuator assembly, lose its rigidity and/or outgas particulates into the disk drive enclosure, with deleterious results. Such outgassing from the coil overmold, coil insulators and/or from other materials applied to the coil wires (such as wire lubricants, for example) may occur even at relatively low temperatures (85° C., for example). Thus, there is a need to monitor the temperature of the VCM coil so as to reduce the likelihood that the VCM will become damaged from such overheating.

One possible solution to the problem of excessive coil temperature is to blindly limit the VCM control current, i.e. without sensing or estimating the coil temperature, so as to be absolutely sure that the temperature of the coil is less than a threshold value. For example, following a first seek operation, a subsequent seek could be delayed so as to be sure that heat added to the coil during the first seek operation is substantially dissipated to the environment before the subsequent seek occurs. Alternatively, the resistive heat gain in the coil could be reduced by reducing the commanded current through the coil. However, because of the difficulty in estimating how well the environment can remove heat from the coil, the foregoing methods of blindly limiting the coil current will likely require overly conservative limitations. Thus, while possibly preventing the coil from overheating, the foregoing solution will likely result in unacceptably slow drive performance.

Another solution is proposed in U.S. Pat. No. 5,594,603 to Mori et al. and assigned to Fujitsu Limited, Japan. In this patent, the current applied to the coil is used to approximate the coil temperature. This method attempts to mathematically model the thermal behavior of the coil by inter-relating a group of factors that includes the VCM control current, the heat naturally radiated by the coil, the ambient temperature, and the thermal capacity of the coil. However, such modeling, although providing an indication of the present VCM temperature, may not accurately provide a calculated temperature value that reliably matches the present and actual temperature of the VCM.

Indeed, a number of factors may skew the results obtained from such mathematical models. For example, the present temperature of the drive or the resistance of the VCM coil may not remain constant and may thus result in changing VCM control current magnitudes. As the VCM control current is used as the basis for the temperature calculations, the VCM may not be driven (i.e., supplied with VCM control current) in an optimal manner and the actuator may not sweep as rapidly across the disk as it might otherwise have, thereby needlessly limiting the overall performance of the drive. Alternatively, should the mathematical model prove to be an inaccurate predictor of actual VCM temperature, in certain situations, excessive VCM control currents may be generated, potentially causing damage to the VCM and to the drive. Over many iterations, recursively-applied mathematical models may cause an initial and relatively small error to grow to such a degree that the model no longer accurately reflects present operating conditions. Reliance upon such an inexact mathematical model in modulating the VCM control current may understandably result in less than optimal drive performance characteristics.

Another proposed solution is proposed in U.S. Pat. No. 5,128,813 to Lee (hereafter the '813 patent) and assigned to Quantum Corporation. In this patent, a discrete temperature-sensing element is used to dynamically sense the VCM temperature during the operation of the drive. This patent discloses that the thermistor is mounted for thermal conduction directly to the head and disk assembly. While the temperature sensing element may, in fact, provide a direct measurement of the temperature of the VCM (in contrast to the Mori et al. patent above, for example), this method requires mounting a high precision thermistor to the drive and requires that appropriate signal conditioning means be provided to measure, quantize and interpret the resistance of the thermistor. In many aspects, however, disk drive designers and manufacturers operate in all environment that has acquired many of the characteristics of a commodity market. In such a market, the addition of even a single, inexpensive part can directly and adversely affect competitiveness. In this case, therefore, the addition of the thermistor and associated signal conditioning means discussed in the '813 patent maybe of little practical value.

From the foregoing, it will be appreciated that there is a need for improved methods of monitoring the temperature of a disk drive voice coil motor that are accurate, reliable and inexpensive in their implantation. Specifically, these methods should not rely upon complex and error prone mathematical modeling schemes or upon costly temperature sensing circuitry.

SUMMARY OF THE INVENTION

The aforementioned needs are satisfied by the hard disk drive according to one aspect of the present invention that stores information and receives current from a power supply. The hard disk drive comprises a magnetic medium having a plurality of magnetic domains disposed therein, wherein the magnetization states of the domains define the information stored on the hard disk drive. The drive further comprises a transducer for affecting and sensing the magnetization states of the magnetic domains and an actuator for moving the transducer between positions adjacent the magnetic domains. The actuator comprises an actuator coil that receives current from the power supply so that a conducting path is defined by the power supply and the actuator coil. The drive further comprises a control system for controlling the current flowing through the actuator coil, wherein the control system samples at least one electrical characteristic of the conducting path which is indicative of the temperature of the actuator coil so as to allow the control system to measure the temperature of the actuator coil.

In a second aspect, a method of regulating the temperature of an actuator coil of a hard disk drive comprises directing a current through the actuator coil, sampling at least one electrical characteristic of a conducting path defined by the actuator coil, extracting the temperature of the actuator coil from the sampled at least one electrical characteristic, and adjusting a current which is directed through the actuator coil according to the extracted temperature as to inhibit the temperature of the actuator coil from exceeding a threshold value.

In a third aspect, a method of regulating the temperature of an actuator coil of a hard disk drive comprises directing current through a conducting path defined by the actuator coil so as to accelerate a transducer of the hard disk drive, sampling at least one electrical characteristic of the conducting path, and adjusting the current which is directed through the actuator coil according to the sampled at least one electrical characteristic.

In a fourth aspect, a method of estimating the temperature of an actuator coil of a hard disk drive comprises developing a first parameter indicative of a resistive component of the voltage across the actuator coil, developing a second parameter indicative of a current flowing through the actuator coil, combining the first and second parameters to obtain an estimate of the resistance of the actuator coil, and extracting the temperature of the actuator coil from the estimated resistance of the actuator coil.

In a fifth aspect, a method of measuring the resistance of an actuator coil of a hard disk drive comprises directing current through the actuator coil, and sampling a voltage across the coil so as to obtain a sampled voltage value. The voltage across the coil includes a resistive component and a back emf component and the sampled voltage value includes a resistive component and a back emf component. The method further comprises sampling a current flowing through the coil so as to obtain an a sampled current value, multiplying the sampled current value by an adjustable factor so as to obtain an estimate of the resistive component of the sampled voltage value and subtracting the estimated resistive component of the sampled voltage value from the sampled voltage value so as to obtain an estimate of the back emf component of the sampled voltage value. The method further comprises successively adjusting the adjustable factor until the estimated back emf component of the sampled voltage value is approximately equal to the known back emf value, and extracting the resistance of the coil from the adjustable factor.

In a sixth aspect, a method of measuring the temperature of an actuator coil of a hard disk drive comprises directing a current through the coil, generating a first signal indicative of the voltage across the coil, generating a second signal indicative of the current flowing through the coil, and extracting the temperature of the coil from the first and second signals In one embodiment, the method further comprises generating a third signal by incorporating an adjustable factor into the second signal, wherein the third signal is indicative of an estimate of a resistive component of the voltage across the coil. The method further comprises generating a fourth signal by combining the first and third signals, wherein the fourth signal is indicative of an estimate of a back emf component of the voltage across the coil. The method further comprises adjusting the adjustable factor until the estimated back emf component corresponding to the fourth signal is approximately equal to the expected back emf value.

From the foregoing, it should be apparent that hard disk drive and the methods of providing the same of the present invention provide faster data throughput and improved reliability in a manner that does not substantially increase the cost of the drive. These and other objects and advantages of the present invention will become more apparent from the following description taken in conjunction with the accompanying drawings.

DETAILED DESCRIPTION OF THE PREFERRED EMBODIMENT

Figure 1:
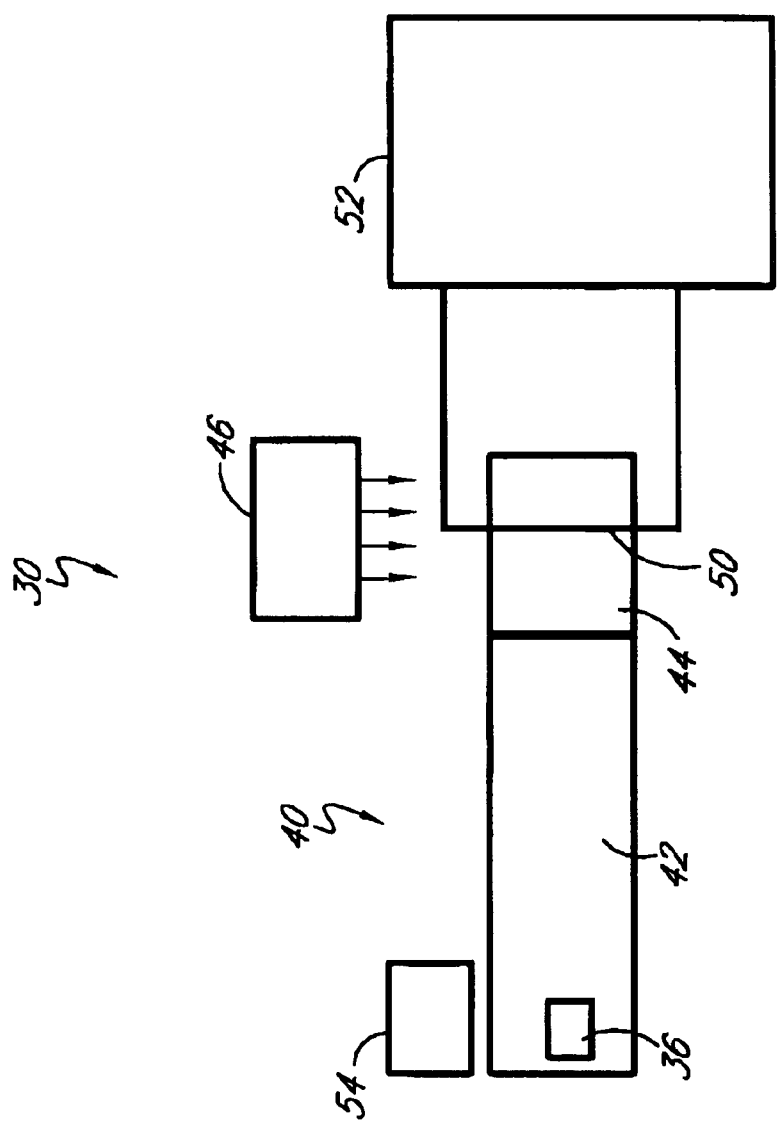
FIG. 1 is a schematic diagram illustrating a hard disk drive according to one aspect of the present invention.

Reference will now be made to the drawings wherein like numerals refer to like parts throughout. FIG. 1 schematically illustrates a hard disk drive 30 for storing information according to one aspect of the present invention. The hard disk drive comprises a magnetic medium 32 having a plurality of magnetic domains 34 disposed therein such that the magnetization states of the domains 34 define the information stored on the hard disk drive 30. The medium 32 is preferably disposed on a disk-shaped member. The drive 30 further comprises a transducer 36 for affecting and sensing the magnetization states of the magnetic domains 34 and an actuator 40 for disposing the transducer 36 adjacent the magnetic medium 32 and for moving the transducer 36 between positions adjacent the medium 32.

The actuator 40 comprises a pivotally mounted actuator arm 42 coupled to the transducer 36, an actuator coil 44 coupled to the actuator arm 42, and a magnetic field source 46, such as a permanent magnet, for exerting forces onto the coil 44 when current flows through the coil 44. The arm 42 is able to pivot in a plane parallel to a recording surface of the magnetic medium 32 such that the arm 42 is able to sweep across a substantial portion of the recording surface. The coil 44 comprises a conducting wire wound into a plurality of loops and, thus, defines a conducting path 50 such that a current flowing through the conducting path 50 interacts with the magnetic field of the magnetic source 46 to exert forces onto the coil 44. Consequently, the actuator arm 42 experiences a net torque in response to the current flowing through the coil 44 which angularly accelerates the actuator arm 42 and, thus, linearly accelerates the transducer 36 from an initial state of rest into a state of motion with respect to the field source 46. Furthermore, in response to the coil current flowing in the opposite direction, the actuator arm 42 experiences a torque that subsequently brings the transducer 36 to a state of rest at a new position with respect the medium 32.

Figure 2:
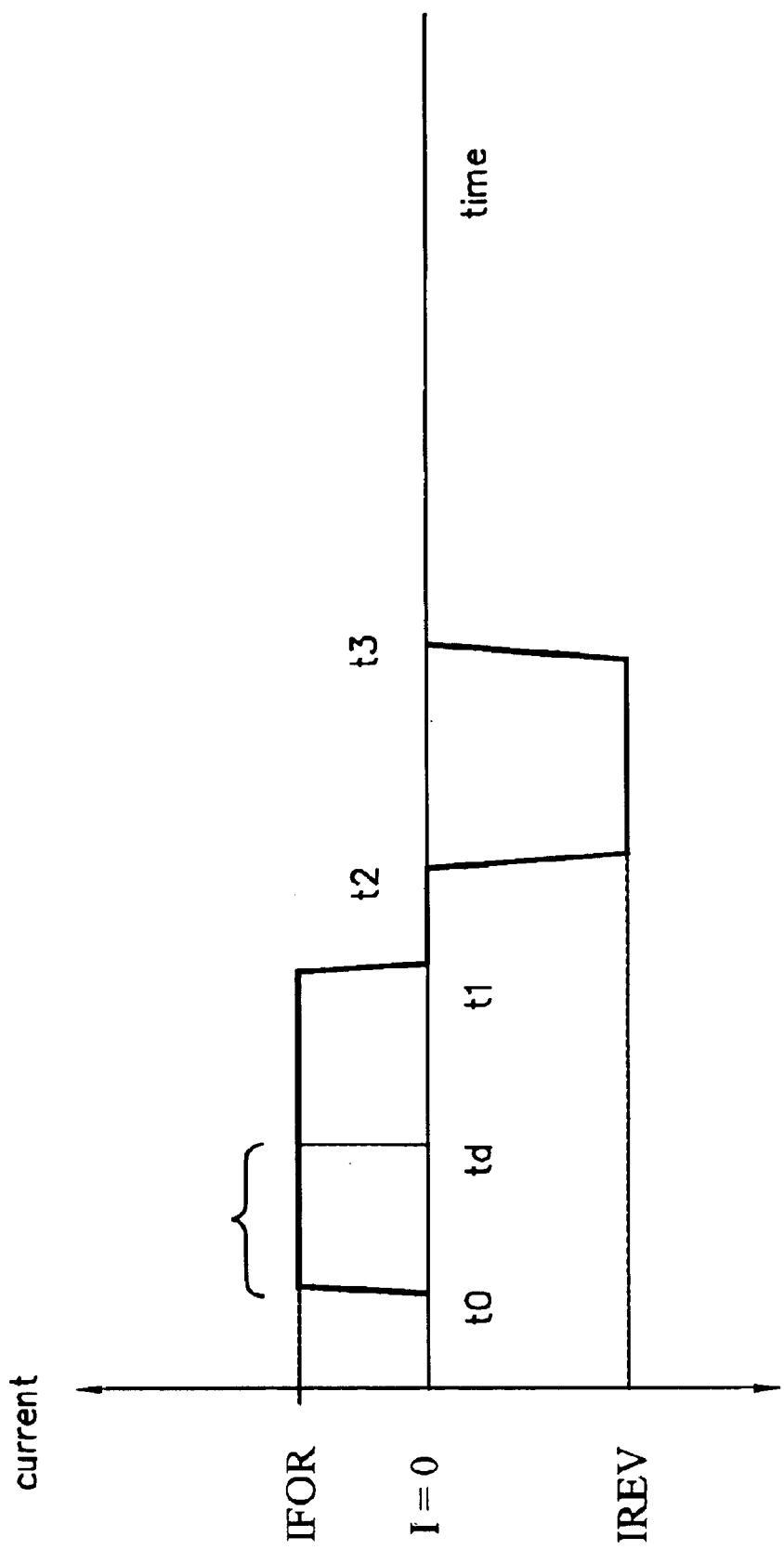
FIG. 2 is a graph of current vs. time that generally illustrates an exemplary seek current profile used for driving an actuator coil of the drive of FIG. 1 during a seek operation.

For example, the simplified current profile illustrated in FIG. 2 could be used to perform a seek operation so as to pivot the actuator arm 42 between first and second orientations. In particular, a forward current is driven through the coil 44 starting at $T_0$ and ending at $t_1$. During this period, the forward current angularly accelerates the actuator arm 42 at a rate which is proportional to the amplitude of the forward current until the time $t_1$ such that the actuator arm 42 reaches a maximum angular speed. Starting at a time $T_2$, a reverse current is driven through the coil 44 so as to decelerate the actuator arm 42 at a rate which is proportional to the amplitude of the reverse current until the reverse current is switched off at a time $t_3$ such that the actuator arm 42 is at rest and the transducer 36 is positioned substantially near a desired final position.

Thus, because the time required to perform the seek operation is simply equal to $t_3$-$t_0$, decreasing this time difference by increasing the magnitudes of the forward and reverse currents will result in a reduced seek time and, therefore, faster access to data stored on the drive 30. However, as mentioned above, increasing the current flowing the coil 44 increases the rate at which heat is generated therein, thereby increasing the likelihood that the temperature of the coil 44 will be elevated to a damaging level. However, as will be described in greater detail below, the drive 30 includes an inexpensive yet effective means for monitoring the temperature of the coil 44 so that the drive 30 can achieve high throughput rates when the temperature of the coil 44 is within an acceptable range and so that the rate of heat generation within the coil 44 can be limited when the temperature of the coil 44 is approaching the upper bounds of the acceptable range.

As shown in FIG. 1, the hard disk drive 30 further comprises an actuator control system 52 for controlling the current that flows through the coil 44. When a request is received by the drive 30 that requires repositioning the transducer 36 to a different position, the control system determines a desired current profile, such as that shown in FIG. 2, and directs current with the desired profile to flow through the coil 44 using techniques that are well known in the art during a normal mode of operation. However, the actuator control system 52 includes a feature not found in the prior art that allows the actuator control system 52 to monitor the temperature of the coil 44. Thus, when the temperature of the coil is determined to be outside of the acceptable temperature range, the control system 52 can assume an alarmed state whereby the control system 52 attempts to limit the current flowing through the coil so as to reduce the average rate of heat generated within the coil.

The control system 52 monitors the temperature of the coil by sampling at least one electrical characteristic of the conducting path 50 of the coil 44 which is indicative of the temperature of the actuator coil 44. For example, the at least one electrical characteristic could be the current flowing through the coil 44, the voltage applied across the coil 44, or both. Furthermore, the conducting path 50 could be further defined by a series component, such as a resistor, disposed in series with the coil 44 and the at least one electrical characteristic of the conducting path 50 could include the current flowing through the series component or the voltage across the series component.

The purpose of sampling the at least one electrical characteristic of the conducting path 50 is to obtain a measure of the resistance of the coil 44. Because the resistance of the coil 44 is directly related to the temperature of the coil 44, a measure of the temperature of the coil 44 can be obtained without requiring additional discrete temperature monitoring devices and without using mathematical modeling techniques.

To understand better how the at least one electrical characteristic of the conducting path 50 defined by the coil 44 is related to a changing coil temperature, it is instructive to describe the electrical characteristics of the coil 44 in greater detail. In particular, when current flows through the coil 44, the coil 44 develops a voltage drop ($V_{coil}$) that includes a resistive component ($V_{res}$), a back emf component ($V_{back}$), and a self-inductance component ($V_{self}$) according to the equation $V_{coil}=V_{res}+V_{back}+V_{self}$. Since the resistive component is simply the product of the current flowing through the coil 44 times the resistance of the coil 44 which is a function of the coil temperature, the resistive component varies with the temperature of the coil 44. Thus, variations in the voltage across the coil 44 or variations in the current through the coil 44 may provide a reliable indication of the variation in the temperature of the coil 44.

However, to reduce the effects on the variations in coil current or voltage due to the back emf or self inductance of the coil, the sampling of the electrical characteristics preferably occurs at a time when these components are either substantially small or at substantially unchanged values. In particular, the back emf component is caused by the 44 changing magnetic flux through the winding of the coil 44 that results when the coil 44 is reoriented with respect to the magnetic field of the permanent magnets 46. Thus the back emf component is zero if the actuator arm 42 is held motionless and non-zero while the actuator arm 42 is pivoting. Consequently, the back emf component can be substantially removed if the actuator arm 42 is held substantially motionless while the sampling is taking place. Alternatively, if the sampling of the electrical characteristics of the conducting path 50 of the coil 44 is sequenced to occur when the actuator arm 42 has substantially the same angular velocity, the back emf component will have a relatively small variation and, thus, will not substantially contribute to the variation in the voltage across the coil or the current through the coil 44.

Furthermore, to reduce the effects of the self inductance of the coil 44, the sampling of the electrical characteristics preferably occurs at a time when the current through the coil 44 has a reduced rate of change. Because the current typically varies rapidly only during an initial brief period of time when the current is switched on, the effects of self-inductance can be greatly reduced if the sampling of the at least one electrical characteristic occurs at a delayed time with respect to the beginning of the commanded current.

As shown in FIG. 1, the hard disk drive further comprises a stop 54 for limiting the motion of the actuator arm 42. In one embodiment, the temperature of the coil 44 is measured while the actuator arm 42 is held in a stationary state. This is accomplished by positioning the arm 42 adjacent the stop 54 in a substantially flush manner and by directing current through the coil 44 such that the arm 42 is forced against the stop 54. As mentioned above, directing current through the coil 44 while the arm 42 is held stationary ensures that the back emf component of the voltage across the coil 44 is essentially zero. Consequently, this allows the resistance of the coil 44 to be measured with greater accuracy.

In another embodiment, the actuator arm 42 is not held in a stationary state when current is directed through the coil 44. More particularly, the resistance and/or temperature of the coil 44 is monitored when the drive 30 is operated in a seek mode. To reduce the effects of the non-zero back emf component of the voltage across the coil, repeated samplings of the at least;one electrical characteristic of the conducting path defined by the coil 44 can occur when the back emf component is substantially the same value. Consequently, because this does not require making the drive 30 unavailable to a host computer during the temperature measuring process, the temperature of the coil 44 can be measured in a manner that does not substantially decrease the throughput of the drive 30.

For example, the samplings can occur at a time $t_d$ which is delayed by a fixed period Δt with respect to the seek start time $t_0$ as shown in FIG. 2. Because all samplings use the same sampling Δt is used in subsequent samplings, it can be inferred that the actuator arm will always have substantially similar angular velocity during subsequent samplings. Thus, because the back emf component is proportional to the angular velocity, the back emf component will not change substantially from one sampling to the next.

In another embodiment the sampling can occur at a time when an independent measurement of the angular velocity is substantially equal to a predetermined fixed value. For example, the velocity of the arm can be independently measured from servo position signals corresponding to the transducer passing pre-mapped servo sections of the medium.

In yet another embodiment, the back emf component can be removed by calculating the back emf component of the voltage across the coil using known techniques that can rely on the independently measured angular velocity of the arm. Thus by subtracting the calculated back emf component from the measured voltage across the coil, the resistive component of the voltage across the coil can be estimated. An advantage of this method of removing the back emf component is that it does not require subsequent samplings to occur when the angular velocity of the actuator arm is substantially the same value.

Figure 3:
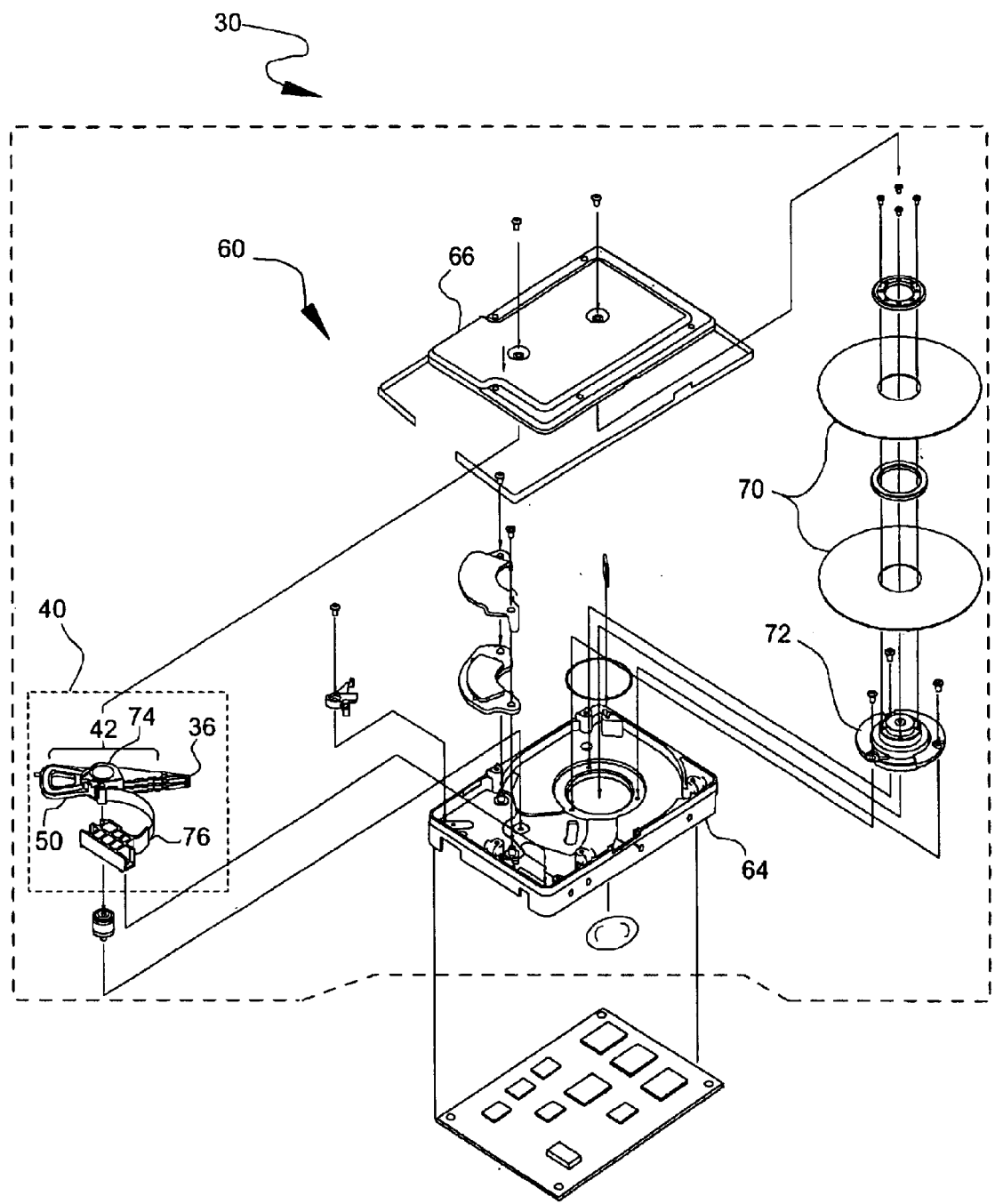
FIG. 3 is an exploded view of a preferred embodiment of the drive of FIG. 1.

Reference will now be made to FIG. 3 which illustrates a preferred embodiment of the disk drive 30 of FIG. 1 in greater detail. The drive 30 comprises a hard disk assembly (HDA) 60 and a printed circuit board assembly (PCBA) 62. The HDA 60 includes a base 64 and a cover 66 attached to the base 66 that collectively houses at least one rotatably mounted magnetic disk 70, a spindle motor 72 attached to the base 64 for rotating the mounted disk 70, the actuator 40, and the known transducer element 36 for converting electrical signals into a corresponding modulated magnetic field and for converting a modulated magnetic field into corresponding electrical signals. The preferred actuator 40 is a swing-type or rotary actuator that includes a body portion 74, at least one actuator arm 42 extending from the body portion 74, and the coil portion 50 extending from the body portion 74 in an opposite direction from the actuator arm 42. The coil portion 50 comprises a conducting wire wound into a plurality of loops that forms a voice coil motor (VCM) when combined with one or more permanent magnets.

As shown in FIG. 3, the transducer element 36 is coupled to a first end of the arm 42 so that the transducer 36 can be positioned adjacent a recording surface of the disk 70 at a first radius when the arm 42 is positioned over the disk 70 and so that the transducer 36 can be moved to a second radius by pivoting the arm 42 across the recording surface. The spindle motor 72 rotates the disk 70 at a constant angular velocity so that, when the transducer 36 is maintained at a substantially fixed radial position, electrical signals originating from or terminating at the transducer 36 allow data to be retrieved or stored within a corresponding circular track of the disk 70. Furthermore, such electrical signals are delivered to the PCBA 62 via a known flex cable 76 so as to enable the actuator arm 42 to pivot without obstruction.

In one embodiment, the storage capacity of the drive 30 is increased by utilizing a plurality of overlapping disks 70 as shown in FIG. 3. The disks 70 are separately written to and read from a corresponding plurality of overlapping transducers which are separately supported by a corresponding plurality of overlapping actuator arms.

Figure 4:
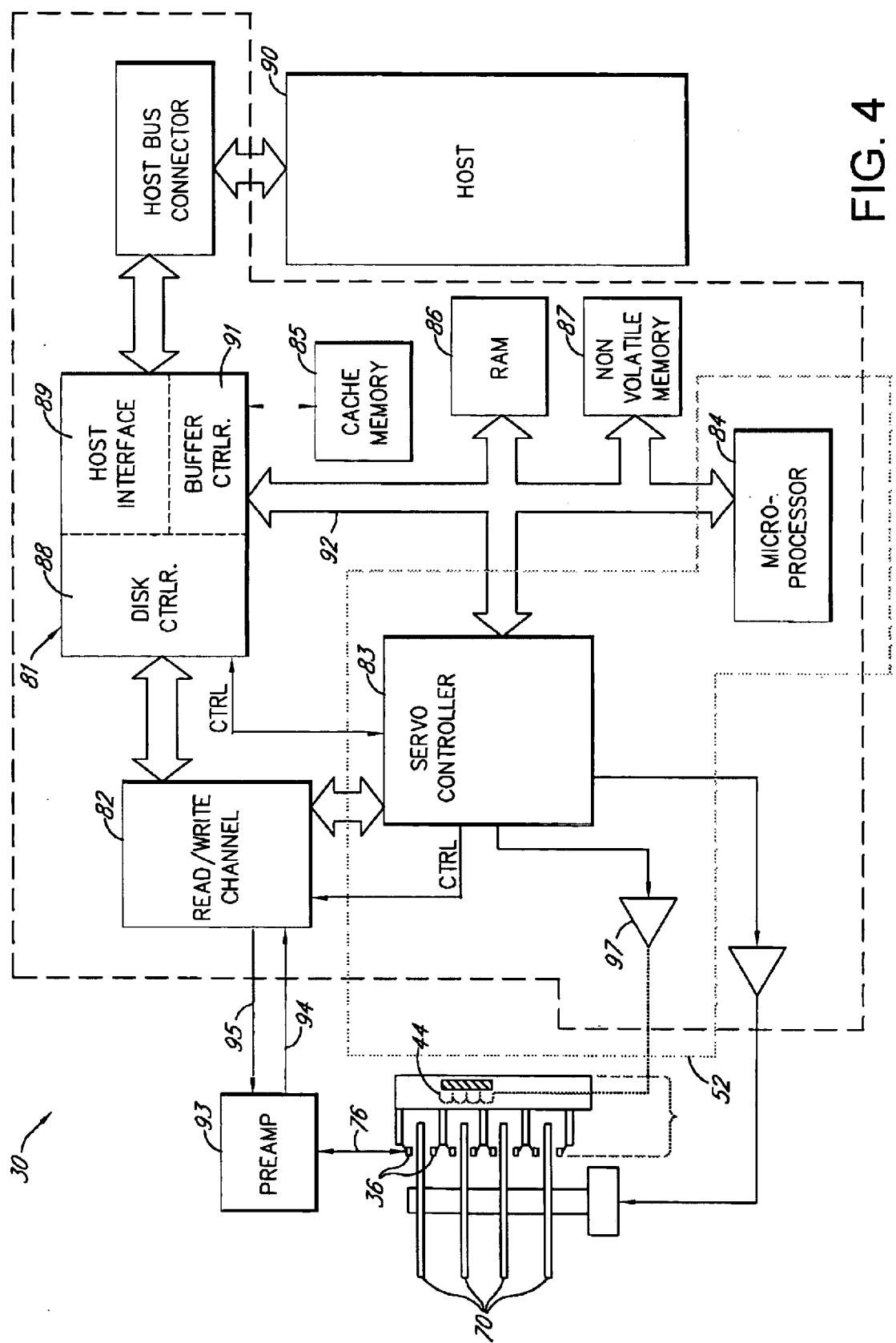
FIG. 4 is a schematic diagram illustrating a plurality of components of the drive of FIG. 3.

Reference will now be made to FIG. 4 which schematically illustrates a plurality of electronic components of the drive 30. The disk drive 30 comprises a host interface and disk controller (HIDC) 81, a read/write channel 82, a servo controller 83, a microprocessor 84, and several memory arrays, including cache memory buffer 85, random access memory (RAM) 86, and non-volatile memory 87. The HIDC 81 comprises a disk controller 88 for formatting and providing error detection and correction of disk data, a host interface controller 89 for responding to commands from a host 90, and a buffer controller 91 for storing data which is transferred between disks 70 and host 90. Collectively, the controllers in the HIDC 81 provide automated functions that assist the microprocessor 84 in controlling disk operations.

Host-initiated operations for reading and writing data in disk drive 30 are executed under the control of the microprocessor 84 connected to the controllers and memory arrays via a bus 92. Program code executed by microprocessor 84 is stored in non-volatile memory 87 and RAM 86. Program overlay code stored on reserved tracks of disks 70 may also be loaded into RAM 86 as required for execution. In the preferred embodiment, the components of the drive 30 illustrated in FIG. 3 are integrated into a single disk processor unit. However, it will be appreciated that, in another embodiment, the components of the drive 30 could be distributed among a plurality of integrated circuit packages.

As schematically shown in FIG. 4, the transducers 36 of the drive are coupled to preamplifiers 93 via the flex cable 76 so as to amplify electrical signals originating from and terminating at the transducers 36. The preamplifiers 93 are connected to the read/write channel 82 via read data lines 94 and write data lines 95. During disk read and write operations, data transferred by preamplifiers 93 is encoded and decoded by read/write channel 82. During read operations, channel 82 decodes data into digital bits transferred on an NRZ bus 96 to HIDC 81. During write operations, the HIDC 81 provides digital data over the NRZ bus 96 to channel 81 that encodes the data prior to its transmittal to preamplifier 93. Preferably, channel 93 employs partial response maximum likelihood (PRML) coding techniques, although other coding processes could be used without departing from the spirit of the present invention.

As shown in FIG. 4, the servo controller 83, the microprocessor 84, and a VCM driver 97 collectively form one embodiment of the actuator control system 52 mentioned earlier in connection with FIG. 1. In this embodiment, the VCM driver 97 is a known controllable source of current and is serially connected to the coil 44 so that the current flowing from the VCM driver 97 also flows through the coil 44. Furthermore, the VCM driver 97 is controlled by the servo controller 83 which is commanded by the microprocessor 84.

For example, when the host computer 90 issues a command requesting data from a particular track on the disk 70, the microprocessor 84 instructs the servo controller 83 to assume a seek mode of operation so as to reposition the transducer 36 at the requested track. Utilizing a control loop having a frequency on the order of 1000 Hz, the servo controller 83 receives servo information from the transducer 36 as the transducer passes dedicated servo sections of the disk 70 so as to determine an updated position and velocity of the transducer 36 with respect to the disk 70. Using the updated position and velocity, the servo controller 83 repeatedly alters the motion of the transducer 36 by instructing the VCM driver 97 to generate an appropriate current to flow through the coil 44 so that the transducer 36 is subsequently displaced to the requested radial position.

As mentioned in the background section of this paper, the current flowing through the VCM coil 44 adds heat to the coil 44 which, if unregulated, can potentially raise the temperature of the coil 44 to a damaging level. To reduce the likelihood of such an occurrence, the control system 52 monitors the temperature of the coil 44 in a manner that will be described in greater detail below and switches between first and second modes of operation accordingly. In particular, when the coil temperature is determined to be below a critical temperature, the actuator control system 52 operates in the first mode such that a larger average current with respect to the average current of the second mode is driven through the coil 44 so as to improve the throughput of the drive. Furthermore, when the coil temperature is determined to be above the critical temperature, the actuator control system 52 operates in the second mode such that a smaller average current with respect to the average current of the first mode is driven through the coil 44 so as to inhibit further heating of the coil 44.

In one embodiment, the control system 52 in the first mode provides a command current having an increased amplitude so as to more rapidly accelerate the transducer 36. Furthermore, the control system 52 in the second mode provides a command current having a decreased amplitude so as to reduce the instantaneous rate at which electrical energy is converted into heat within the coil 44. In another embodiment, the control system 52 in the second mode increases the dwell time or time between subsequent seeks so as to essentially reduce the average current flowing through the coil 44 and, therefore, reduce the average rate of heat generated within the coil 44.

Figure 5:
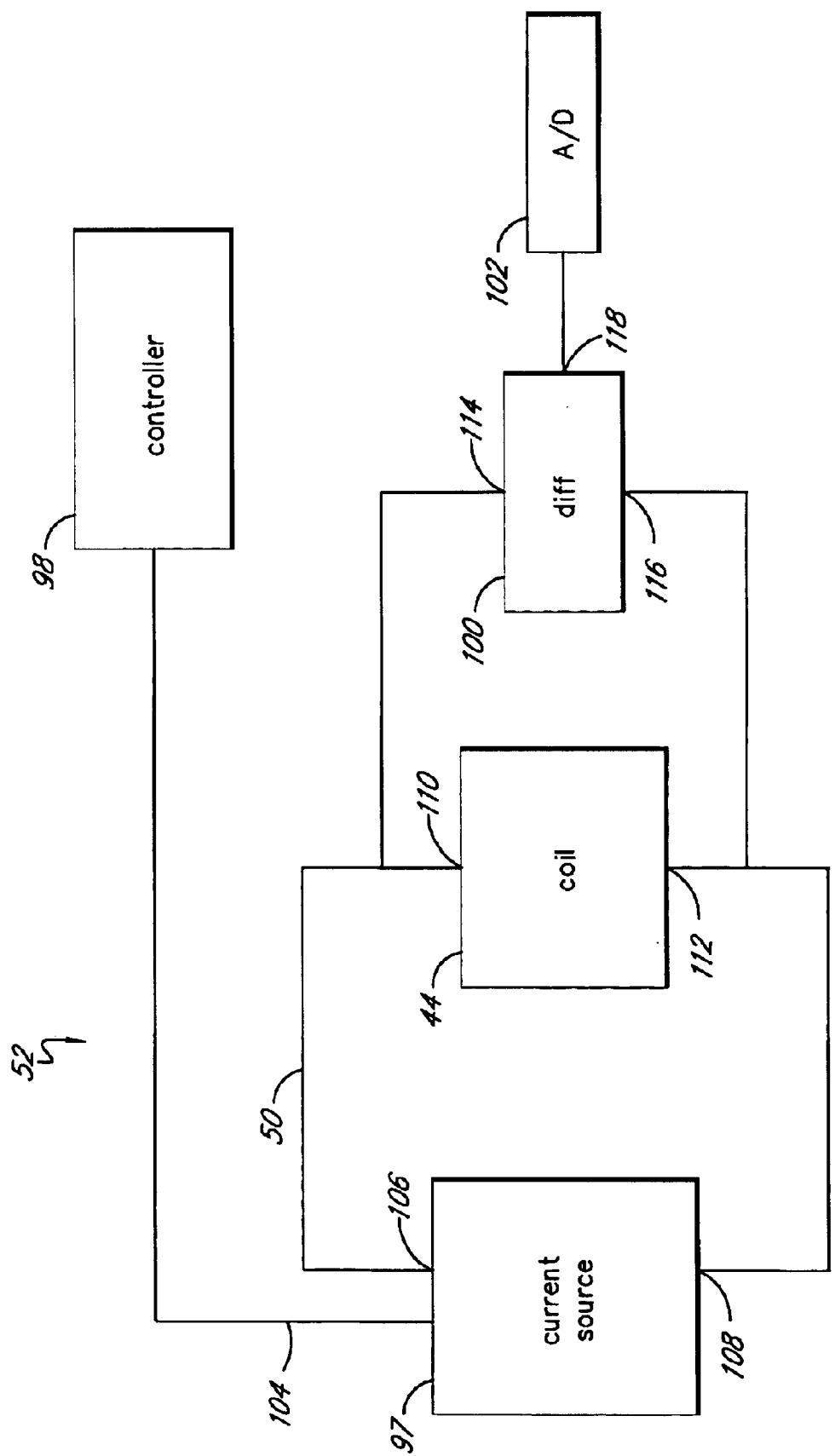
FIG. 5 is a schematic diagram illustrating one embodiment of an actuator control system which is adapted to monitor the temperature of an actuator coil of the drive of FIG. 1.

Reference will now be made to FIG. 5 which illustrates one embodiment of the actuator control system 52 of the hard disk drive of FIG. 1. In particular, the control system 52 comprises a controller 98, the commandable current source 97, a difference unit 100, and an analog to digital (A/D) converter unit 102. The controller 98 comprises the servo-controller 83 and microprocessor 84 of FIG. 4. The controller 98 is linked to the current source via a communication path 104 such that a commanded current value can be transmitted to the current source 97 across the communication path 104. The current source 97 receives the commanded current value from the controller 98 and generates a current corresponding to the commanded current value to flow between first and second outputs 106 and 108 of the current source 97. More particularly, the current source 97 provides an output voltage across the outputs 106, 108 which generates the output current with an amplitude equal to the commanded current value. However, if the required output voltage is greater than that which can be supplied by the current source 97, the output voltage will become saturated and the resulting output current, known as the saturated output current, has a magnitude less than the commanded current value.

As shown in FIG. 5, first and second ends 110 and 112 of the VCM coil 44 are electrically connected to the respective first and second outputs 106, 108 of the current source 97 such that the conducting path 50 that is defined between the first and second outputs 106,108 of the current source 97 extends along the windings of the coil 44. Consequently, current flowing from the outputs 106,108 of the current source 97 also flows through the coil 44, thereby generating a torque onto the actuator arm 42 of FIG. 1.

As shown in FIG. 5, the difference unit 100 includes first and second inputs 114 and 116 electrically coupled to the respective ends 110,112 of the coil 44 and an output 118 electrically coupled to the A/D unit 102. The difference unit 100 generates an output signal from the output 118 which is indicative of the voltage applied across the inputs 116,118. In one embodiment, the difference unit comprises a differential amplifier which is configured to have a gain of one. Under the command of the controller 98, the A/D unit 102 samples, or digitizes, the output signal from the difference unit 100 and provides the controller 98 with access to the digitized value.

Figure 6:
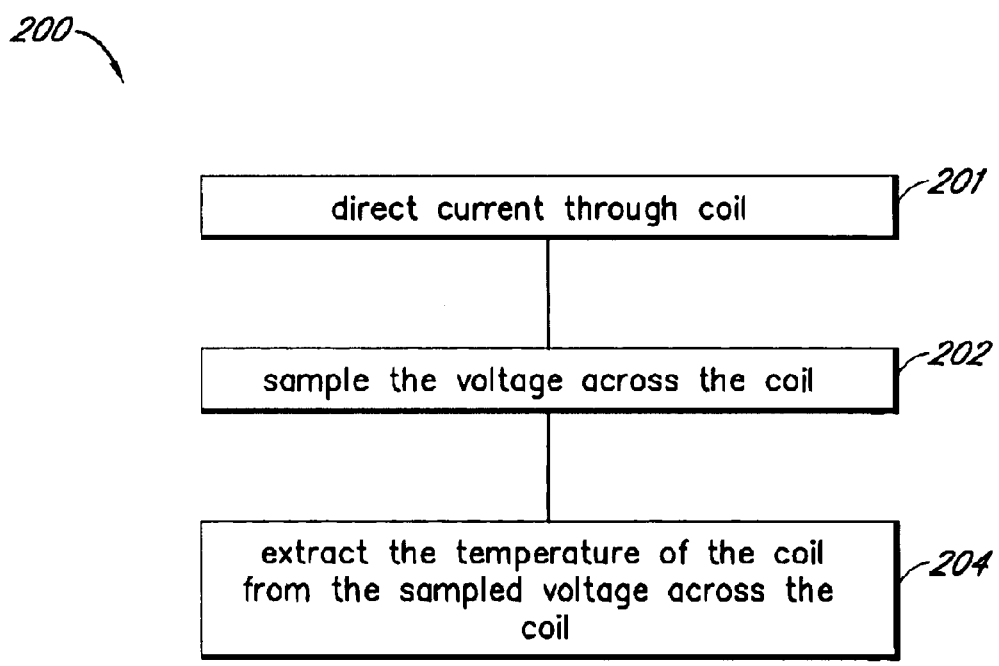
FIG. 6 is a flow chart illustrating one embodiment of a method of measuring the temperature of the coil used by the control system of FIG. 5.

Reference will now be made to FIG. 6 which illustrates one embodiment of a method 200 of measuring the coil temperature used by control system 52 of FIG. 5. In particular, the controller 98, in a state 201, issues a commanded current value to the current source 97 which generates a current to flow through the coil 44. The controller 98, in a state 202, then samples the voltage across the coil 44 by digitizing the output of the difference unit 102 while the current is flowing through the coil 44. In one embodiment, the current flowing through the coil 44 is substantially the same during subsequent samplings so that changes in the sampled voltage across the coil 44 are not caused by changes in the current flowing through the coil 44. Thus, changes in the sampled voltage across the coil 44 are indicative of changes in the resistance of the coil 44.

As shown in FIG. 6, the controller 98, in a state 204, then extracts the temperature of the coil 44 from the sampled voltage across the coil 44. In one embodiment, the controller 98 extracts the temperature of the coil 44 using a lookup table stored in memory which is available to the controller 98. The lookup table comprises a plurality of data points of pre-measured coil temperature vs. coil voltage. The data points of the lookup table can be generated by disposing the drive 30 in an environment having a known temperature, sampling the voltage across the coil 44 in the manner described above at the known temperature, changing the temperature of the environment, and repeating the sampling of the voltage across the coil 44. In one embodiment, the lookup table returns a single bit binary value indicating whether the temperature of the coil 44 is excessively high. In one embodiment, a mathematical equation is fit to the pre-measured data points and the resulting fitted equation is used by the controller to extract the temperature of the coil 44 from the sampled voltage across the coil 44.

Figure 7:
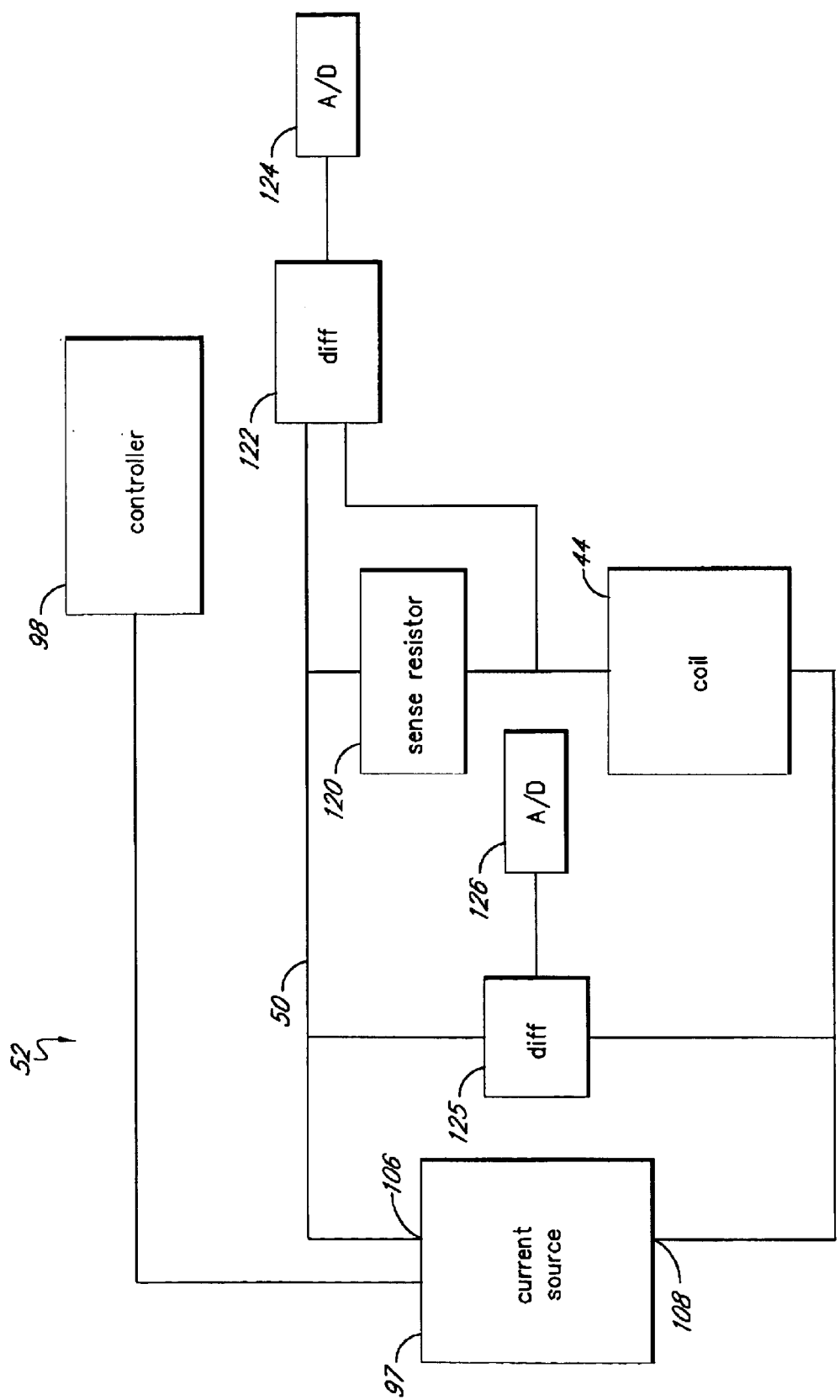
FIG. 7 is a schematic diagram illustrating another embodiment of the actuator control system of the drive of FIG. 1.

Reference will now be made to FIG. 7 which illustrates another embodiment of the actuator control system 52 of the hard disk drive 30 of FIG. 1. The control system 52 of FIG. 7 is similar to that of FIG. 5 in that it comprises the controller 98 and the commandable current source 97. However, the control system of FIG. 7 further comprises a sense resistor 120 having a precisely known resistance. As will be described in greater detail below, the sense resistor 120 is used to measured the current flowing through the coil 44. In one embodiment, the sense resistor 120 is known to within one percent even though the coil resistance varies by as much as thirty percent due to the temperature of the coil 44 changing from 25 degrees Celsius to 85 degrees Celsius. The known value of the sense resistor 120 is stored in a memory which is available to the controller 98. The sense resistor 120 is disposed in series with the coil 44 so that the conducting path 50 extending between the outputs 106,108 of the current source 97 further comprises the sense resistor 120.

As shown in FIG. 7, the control system 52 further comprises a difference unit 122 and an A/D unit 124 similar to those of FIG. 5. The difference unit 122 is configured to provide an output signal which is indicative of the voltage across the sense resistor 120. The A/D converter 124 unit is configured to sample the output of the difference unit 122 and, thus, provide the controller 98 with a sampled value which is indicative of the voltage across the sense resistor 120. Because the resistance of the sense resistor 120 is a relatively well known quantity, the controller 98 is able to divide the voltage across the sense resistor 120 by the known value of the resistance of the sense resistor 120 to obtain an accurate measurement of the current flowing through the sense resistor 120. Furthermore, because the current flowing through the sense resistor 120 is essentially the same as the current flowing through the coil 44, the controller 98 is provided with an accurate measurement of the current flowing through the coil 44.

In one embodiment, the control system 52 of FIG. 7 further comprises a second difference unit 125 disposed so as to provide an output signal which is indicative of the output voltage of the current source 97. The control system 52 further comprises a second A/D converter 126 unit configured to sample the output of the second difference unit 125 and, provide the controller 98 with a measurement of the voltage across the outputs of the current source 97. The purpose of the second difference unit 125 and second A/D unit 126 is to enable the controller 98 to check to see whether the change in the voltage across the sense resistor 120 is, in part or in whole, due to a change in a supply voltage of the current source 97.

Figure 8:
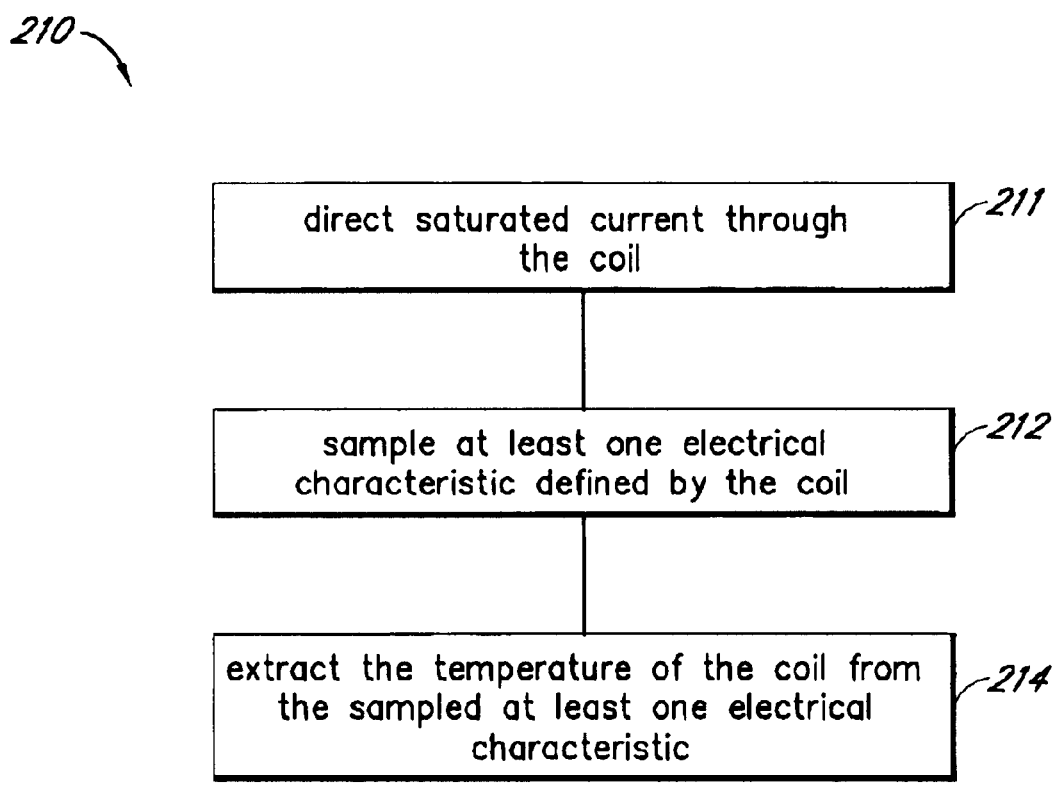
FIG. 8 is a flow chart illustrating one embodiment of a method of measuring the temperature of the coil used by the control system of FIG. 7.

Reference will now be made to FIG. 8 which illustrates one embodiment of a method 210 of measuring the coil temperature used by the control system 52 of FIG. 7. In particular, the controller 98, in a state 211, issues a commanded current value to the current source 97 which results in the output current being saturated. Because the saturated current provided by the current source 97 depends on the resistance of the conductive path 90 between the outputs 106,108 of the current source 97, a change in the resistance of the coil 44 will affect the saturation current. Thus, by measuring the saturated current, an indication of the resistance of the coil 44 and, therefore, the temperature of the coil 44 can be obtained.

As shown if FIG. 8, the controller 98, in a state 212, then samples at least one electrical characteristic of the conducting path defined by the coil. In particular, the controller samples the voltage across the sense resistor 120 by digitizing the output of the difference unit 125 while the saturated current is flowing through the coil 44. In a preferred embodiment, the controller also samples the voltage across the current source 97 so as to determine if the current source 97 is experiencing a drop-off in output voltage.

As shown in FIG. 8, the controller 98, in a state 214, then extracts the temperature of the coil 44 from the at least one sampled electrical characteristic of the conducting path defined by the coil. In particular, the controller 98 extracts a measurement of the saturated current flowing through the coil 44 from the sampled voltage across the sense resistor 120 by dividing the sampled voltage across the sense resistor 120 by the stored resistance of the sense resistor 120. Because the saturated current flowing through the coil 44 is affected by the resistance of the coil 44, the temperature of the coil 44 can be extracted from the saturated current using a predetermined lookup table or a pre-fitted equation.

Figure 9:
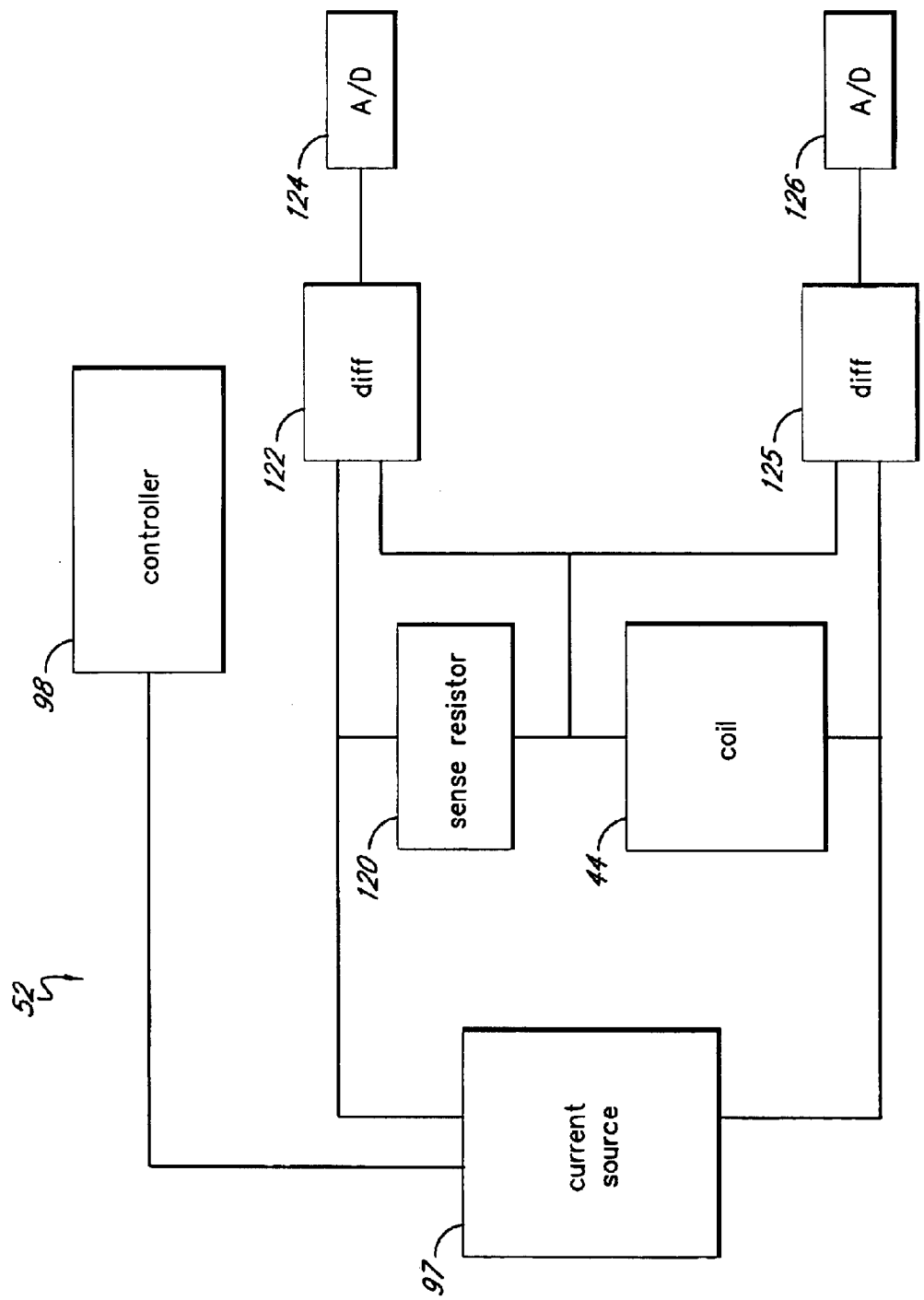
FIG. 9 is a schematic diagram illustrating yet another embodiment of the actuator control system of the drive of FIG. 1.

Reference will now be made to FIG. 9 which illustrates yet another embodiment of the actuator control system 52 of the hard disk drive 30 of FIG. 1. The control system 52 of FIG. 9 is similar to that of FIG. 7 in that it comprises the controller 98, the commandable current source 97, the sense resistor 120, the difference units 122 and 125 and the A/D converter units 124 and 126 configured in a substantially identical manner. However, the second difference unit 125 is configured to develop a signal which is indicative of the voltage across the coil 44 and the second A/D unit 126 is configured to sample the output of the second difference unit 125 so as to provide the controller 98 with the sample of the voltage across the coil 44.

Figure 10:
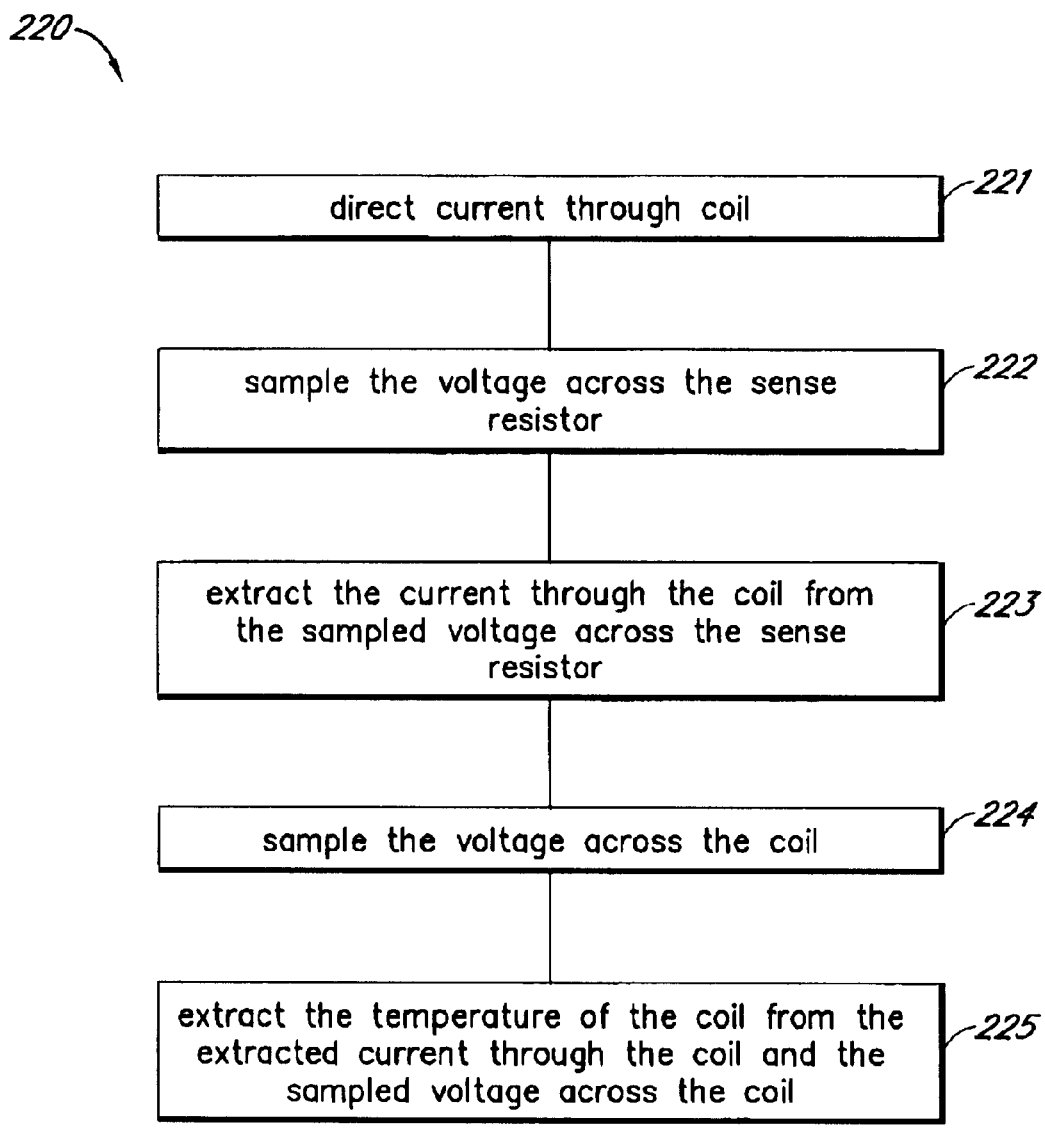
FIG. 10 is a flow chart illustrating one embodiment of a method of measuring the temperature of the coil used by the control system of FIG. 9.

Reference will now be made to FIG. 10 which illustrates one embodiment of a method 220 of measuring the coil temperature used by the control system 52 of FIG. 9. In particular, the controller 98, in a state 221, instructs the current source 97 to generate a current to flow through the coil 44. The controller 98, in a state 222, then samples the voltage across the sense resistor 120 while the current is flowing through the coil 44. The controller 98, in a state 223, then uses the sampled voltage across the sense resistor 120 to extract a measurement of the current flowing through the coil 44 using the techniques described above in connection with FIG. 8.

The controller 98, in a state 224, then samples the voltage across the coil 44 while the current is flowing through the coil 44. Then, in a state 225, the controller 98 extracts the temperature of the coil 44 from the measured current flowing through the coil 44 and the sampled voltage across the coil 44. In particular, the controller 98 calculates the resistance of the coil 44 by dividing the sampled voltage across the coil 44 by the measured current flowing through the coil 44. The controller 98 then extracts the temperature of the coil 44, for example, by using a predetermined lookup table that relates the measured resistance of the coil 44 to the temperature of the coil 44.

Since the controller 98 measures both the current flowing through the coil 44 and the voltage across the coil 44, it is not essential for the current to be saturated. However, because of the likely presence of electronic noise, it is sometimes advantageous to sample the electrical characteristics of the conducting path 50 while the current flowing through the coil 44 is relatively large. Thus, because the maximum current is the saturated current, it may be advantageous to direct saturated current through the coil 44 while measuring the temperature of the coil 44.

Figure 11:
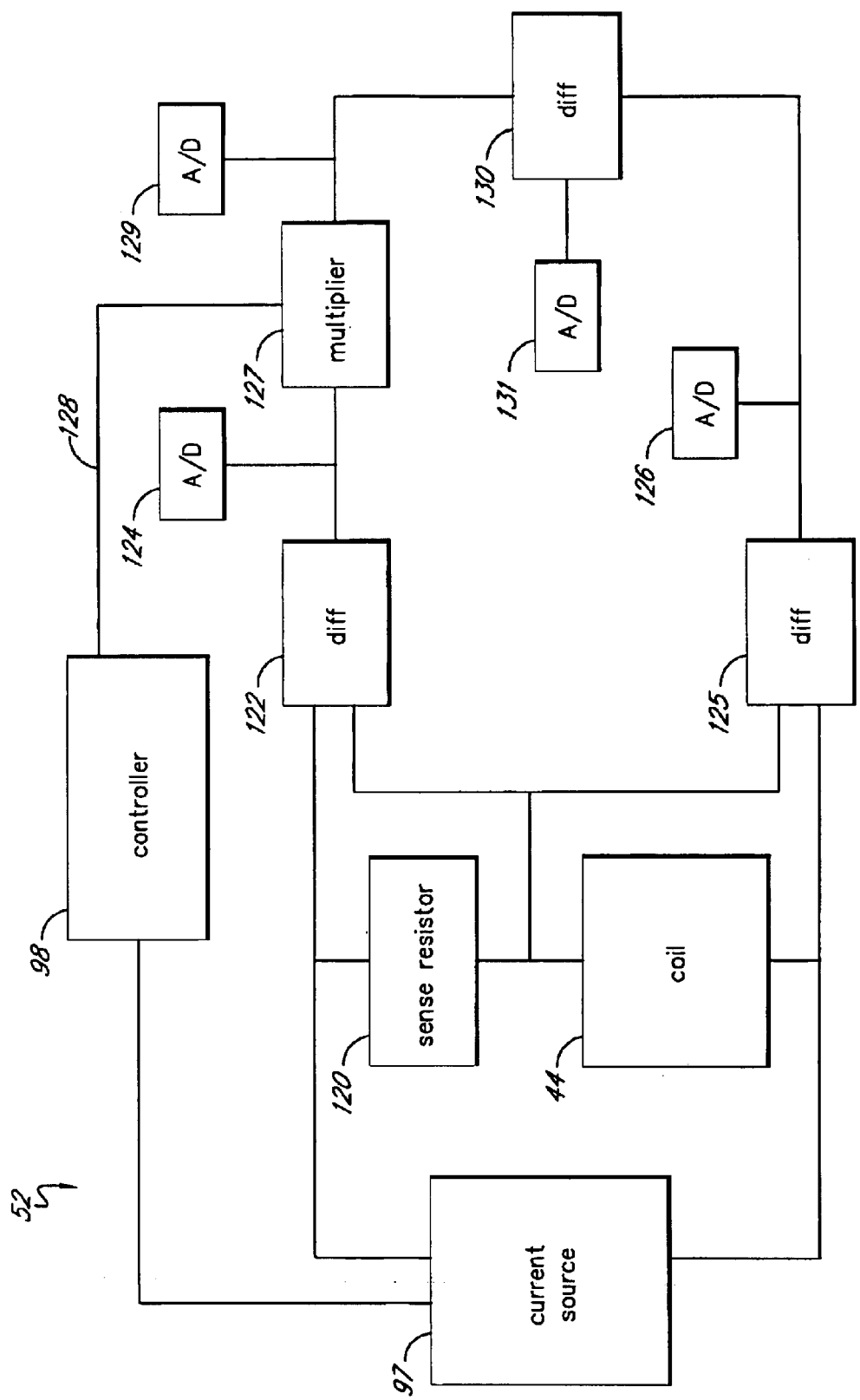
FIG. 11 is a schematic diagram illustrating still yet another embodiment of the actuator control system of the drive of FIG. 1.

Reference will now be made to FIG. 11 which illustrates still yet another embodiment of the actuator control system 52 of the hard disk drive 30 of FIG. 1. The control system 52 of FIG. 11 comprises substantially the same control system described above in connection with FIG. 9 plus additional components for measuring the back emf component of the voltage across the coil 44. In addition, the difference unit 122 coupled to the sense resistor 120 includes a division function that divides the voltage across the sense resistor 120 by the resistance of the sense resistor 120 so that the output of the difference unit 122 is a voltage level scaled to be approximately equal to the current flowing through the coil 44. The control system 52 of FIG. 11 is based on an emergency parking system that maneuvers the actuator arm to a parked position in the event that power is removed from the hard disk drive. The emergency parking system is described in greater detail in the commonly assigned copending U.S patent application entitled DISK DRIVE EMPLOYING VCM DEMAND CURRENT TO CALIBRATE VCM IR VOLTAGE FOR VELOCITY CONTROL OF AN ACTUATOR ARM, application Ser. No. 09/704, 175, filed Oct. 31, 2000, which is incorporated herein in its entirety.

As shown in FIG. 11, the control system 52 further comprises an adjustable multiplier unit 127 which is configured to receive, as input, the output signal from the difference unit 122 which is indicative of the current flowing through the coil 44 and provide an output signal which is a voltage level approximately equal to the current flowing through the coil 44 times the resistance of the coil 44, i.e. the resistive component of the voltage across the coil 44. The multiplier 127 is further configured to receive an adjustable multiplication factor over a communication path 128 from the controller 98 which is referenced by the multiplier 127 to perform the foregoing multiplication process. Thus, the difference between the output of the multiplier unit and the resistive component of the voltage across the coil 44 is related to the closeness between the adjustable factor and the actual resistance of the coil 44. As will be described in greater detail below, the adjustable factor is successively adjusted by the controller 98 until a measured back emf value provided by the control system is approximately equal to an expected back emf value so as to enable fine tuning of the adjustable factor to, thereby, provide a relatively accurate measure of the resistance of the coil 44.

In one embodiment, the adjustable multiplier unit 127 comprises a multiplying digital to analog converter. Furthermore, the control system 52 further comprise a third A/D unit 129 configured to digitize the output signal of the multiplier unit 127 so as to provide the controller 98 with the digitized value of the estimated resistive component of the voltage across the coil 44.

As shown in FIG. 11, the control system further comprises a third difference unit 130 that receives: a) the output from the multiplier unit 127 which is indicative of the resistive component of the voltage across the coil 44; and b) the output from the second difference unit 125 which is indicative of the voltage across the coil 44. The difference unit 130 provides an output signal which is indicative of the difference between the voltage across the coil 44 and the resistive component of the voltage across the coil 44. The control system further comprises a fourth A/D unit 131 configured to digitize the output of the third difference unit 130 so as to provide the controller 98 with an estimate of the back emf component of the voltage across the coil 44.

Figure 12:
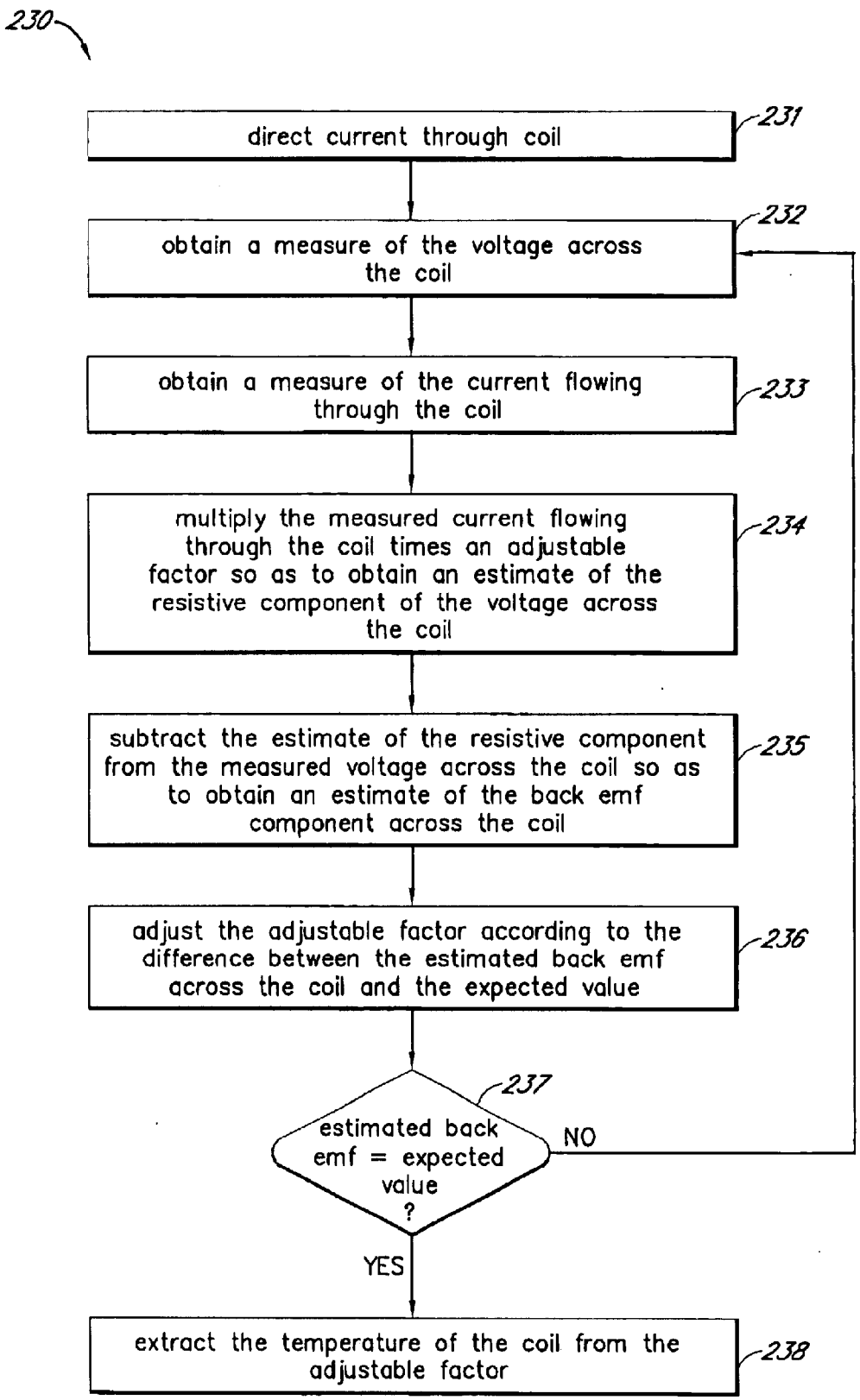
FIG. 12 is a flow chart illustrating one embodiment of a method of measuring the temperature of the coil which can used by either the control system of FIG. 9 or the control system of FIG. 11.

Reference will now be made to FIG. 12 which illustrates a method 230 of measuring the temperature of the coil 44 of FIG. 1 according to one aspect of the present invention. As will be described in greater detail below, this method can be used in the context of the control system 52 of FIG. 9 or in the context of the control system 52 of FIG. 11.

As shown in FIG. 12, the method 230 comprises, in a state 231, directing current to flow through the coil 44. The method 230 further comprises, in a state 232, obtaining a measure of the voltage across the coil 44 and, in a state 233, obtaining a measure of the current flowing through the coil 44. The measured current is then, in a state 234, multiplied by an adjustable factor so as to obtain an estimate of the resistive component of the voltage across the coil 44. The estimate of the resistive component of the voltage across the coil 44 is then, in a state 235, subtracted from the measured voltage across the coil 44 so as to obtain an estimate of the back emf component of the voltage across the coil 44. The adjustable factor is then, in a state 236, adjusted according to the difference between the estimated back emf component and the expected value so as to result in a reduced difference. In a decision state 237, the difference between the estimated back emf component and the expected value is compared with a difference threshold. If the difference is greater than the threshold the state 232 is reentered. However, if the difference is less than the threshold difference it is assumed that fine tuning of the adjustable factor has been achieved. Then, in a state 238, the temperature of the coil is extracted from the adjustable factor.

In one embodiment, the temperature of the coil 44 is extracted from the adjustable factor by first extracting an estimate of the resistance of the coil 44 from the adjustable factor. The temperature is then extracted from the estimated resistance using the techniques described earlier. The estimate of the resistance of the coil can be obtained by having the controller 98 divide the digitized estimate of the resistive component of the voltage across the coil 44 provided by the AD unit 129 by the digitized value of the current flowing through the coil provided by the A/D unit 124. In another embodiment, the temperature of the coil 44 is extracted by applying the adjustable factor to a lookup table.

In the context of the control system 52 of FIG. 11, the method 230 of FIG. 12 is performed substantially by the hardware of the control system 52 as will how be described. In particular, the obtaining of the measures of the current through and voltage across the coil 44 are performed by the respective difference units 122 and 125 with the measures being manifested within the output signals of the difference units 122 and 125. Furthermore, the multiplying step of state 234 is performed by the multiplier unit 127 and the subtraction step of state 235 is performed by the difference unit 130. However, the adjusting step of state 236, the comparison step of state 237, and the extracting step of state 238 are, in this embodiment, performed by the controller 98.

In the context of the control system 52 of FIG. 9, the method 230 of FIG. 12 is performed substantially by software as will now be described. In particular, the obtaining of the measures of the current through and voltage across the coil are performed by the respective difference units 122 and 125 in combination with the A/D units 124 and 126 such that sampled values of the current and voltage are provided to the controller 98. Because the controller 98 has access to the sampled values, the controller 98 is then able to perform the multiplying step of state 234 and the subtraction step of state 235.

In one embodiment, the method of FIG. 12 is performed while the actuator arm is maintained in a stationary state, such as by holding the actuator arm against the stop as described above in connection with FIG. 1. In this case, because the actuator arm is not moving with respect to the magnetic field, the expected back emf value is zero.

In another embodiment, the method of FIG. 12 is performed during a seek operation such that the actuator arm is not maintained in a stationary state. In particular, the value of the back emf corresponding to a first sampling time $t_a$ is used as the expected value from which to compare with the value of the back emf corresponding to a subsequent second sampling, time, $t_b$. Preferably, the sampling times $t_a$ and $t_b$ are selected such that the current flowing through the coil at $t_a$ is substantially different from that of $t_b$ and the angular speed of the actuator arm at $t_a$ is substantially equal to that of $t_b$. In one embodiment, the angular velocities at times $t_a$ and $t_b$ are within five percent of each other. Furthermore, the angular velocity of the actuator arm is extracted from transducer servo signals generated when the transducer passes dedicated servo regions on the disk.

In one embodiment, the first sampling time $t_a$ could correspond to the acceleration phase of the seek operation and second sampling time $t_b$ could correspond to the deceleration phase of the seek operation (see FIG. 2) such that the currents flowing through the coil at times $t_a$ and $t_b$ are in opposing direction. In another embodiment, the first and second samplings are obtained such that the current flowing through the coil at $t_a$ is in the same direction as in $t_b$. For example, the current flowing through the coil at $t_a$ could be twice as large as that current flowing through the coil at $t_b$.

It turns out that the foregoing method of measuring the temperature of the coil by comparing the back emf measured at time $t_a$ with the back emf measured at time $t_b$ provides greater accuracy. In particular, the amplifiers of the difference units of FIGS. 9 and 11 often include offset errors which fluctuates with temperature in an unpredictable manner. For example, the difference unit 125 of FIG. 11 may provide the output signal that corresponds to the voltage across the coil 44 plus a non-zero term corresponding to the offset error of the unit. However, by comparing two measured values of the back emf in the manner described above, the offset error can cancelled or reduced. A more detailed description of the concept of canceling and reducing offset errors is provided in the above-referenced incorporated copending commonly assigned U.S. Patent application. Thus, because the offset errors are reduced, the resulting temperature measurement is more accurate.

It will be appreciated that the actuator control system and methods for providing the same described herein provide many advantages. In particular, because the control system is able to monitor the temperature of the coil, the control system is able to manipulate the transducer more rapidly when the temperature of the coil is not in danger of overheating so as to decrease the seek time of the hard disk drive. Furthermore, upon detecting that the coil is in danger of overheating by observing that the temperature of the coil is approaching an excessively high temperature, the control system can take corrective action to prevent any further heating of the coil. For example, the control system can limit the amplitude of the current flowing through the coil or increase the dwell time between seeks so as to allow the heat built up within the coil to dissipate to the environment.

It will also be appreciated that the methods of measuring the temperature of the actuator coil according to the present invention provide a more effective solution to the problem of excessive coil temperature than those known in the art. In particular, because the temperature is measured by sampling electrical characteristics of the coil which vary in a predictable manner in response to a change in coil temperature, the accuracy of the measurement is improved over methods which rely on theoretical models. Furthermore, because this obviates the need for a discrete temperature transducer and signal conditioning means, fewer discrete components are required, thereby enabling the hard disk drive to be manufactured at reduced cost. In fact, because the methods of measuring the coil temperature disclosed herein are able to utilize existing circuitry required for parking of the drive in the case of an unexpected power shutdown, the added expense to the drive, in this case, is essentially limited to the relatively small expense of developing additional software.

What is claimed is:

1. In a disk drive comprising an actuator arm, an actuator coil adapted to move the actuator arm based on a current, and a control system for controlling a flow of the current through the actuator coil, a method of measuring the temperature of the actuator coil comprising:

holding the actuator arm in a stationary state;

developing a first signal indicative of a resistive component of the voltage across the actuator coil while the actuator arm is in the stationary state to reduce the effects of coil back emf in the developed first signal;

developing a second signal indicative of the current flowing through the actuator coil while the actuator arm is in the stationary state to reduce the effects of coil back emf in the developed second signal; and extracting the temperature of the actuator coil from the first and second signals.

2. The method of claim 1, wherein the disk drive further comprises a stop device adapted to limit the range of motion of the actuator and wherein the holding the actuator arm in a stationary state further comprises:

positioning the actuator arm adjacent to the stop device; and directing the current through the actuator coil for pressing the actuator arm against a surface of the stopping device wherein the actuator arm is held in the stationary state.

3. The method of claim 1, wherein the control system further comprises a current sensor for developing the second signal indicative of the current flowing through the actuator coil.

4. The method of claim 3, wherein the current sensor comprises:

a sense resistor disposed in series with the actuator coil; and a first voltage sensor for providing a first voltage signal indicative of a voltage across the sense resistor.

5. The method of claim 4, wherein the control system further comprises a first voltage sampling unit configured to sample the first voltage signal of the first voltage sensor.

6. The method of claim 5, wherein the disk drive further comprises a power supply for providing the current and a voltage to the actuator coil and wherein the control system further comprises a second voltage sensor for providing a second voltage signal indicative of the voltage received by the actuator coil from the power supply.

7. The method of claim 6, wherein the control system further comprises a second voltage sampling unit configured to sample the second voltage signal of the second voltage sensor.

8. The method of claim 6, wherein the control system further comprises a second voltage sensor providing a second voltage signal indicative of the voltage across the coil.

* * * * *